United States Patent
Grossman

(10) Patent No.: US 9,132,939 B2
(45) Date of Patent: Sep. 15, 2015

(54) REUSABLE MULTI-PURPOSE BAG FORMED OF NONWOVEN FIBROUS MATERIAL

(71) Applicant: Waterview Innovation, LLC, McKinney, TX (US)

(72) Inventor: Eric Grossman, McKinney, TX (US)

(73) Assignee: Waterview Innovation, LLC, McKinney, TX (US)

( * ) Notice: Subject to any disclaimer, the term of this patent is extended or adjusted under 35 U.S.C. 154(b) by 0 days.

(21) Appl. No.: 13/974,790

(22) Filed: Aug. 23, 2013

(65) Prior Publication Data

US 2014/0086511 A1 Mar. 27, 2014

Related U.S. Application Data

(60) Provisional application No. 61/692,676, filed on Aug. 23, 2012.

(51) Int. Cl.
*B65D 33/00* (2006.01)
*B65D 33/08* (2006.01)
*B65D 30/08* (2006.01)
(Continued)

(52) U.S. Cl.
CPC ............... *B65D 33/00* (2013.01); *B65D 31/04* (2013.01); *B65D 31/10* (2013.01); *B65D 33/004* (2013.01); *B65D 33/065* (2013.01); *B65D 33/08* (2013.01); *Y02W 30/807* (2015.05)

(58) Field of Classification Search
CPC ...... B65D 33/10; B65D 33/105; B65D 33/12; B65D 33/14; B65D 33/08; B65D 33/243; B65D 33/02; B65D 33/065; B65D 88/1681; B65D 31/02; B65D 31/04; B65D 33/00; B65D 33/004; A45C 9/00; A45C 3/10; A45C 4/02; B65F 2250/105; B65F 2250/108; B65F 2250/116; Y02W 30/807
USPC ..................... 383/6, 7, 10, 120, 4, 105–109
See application file for complete search history.

(56) References Cited

U.S. PATENT DOCUMENTS

| | | |
|---|---|---|
| 1,600,345 A | 9/1926 | Littman |
| 1,661,143 A | 2/1928 | Littman |
| 1,671,050 A | 5/1928 | Snyder |

(Continued)

FOREIGN PATENT DOCUMENTS

JP 2003-165583 6/2003

OTHER PUBLICATIONS

International Search Report and Written Opinion received in Patent Cooperation Treaty Application No. PCT/US2013/056507, dated Dec. 2, 2013, 11 pages.

*Primary Examiner* — J. Gregory Pickett
*Assistant Examiner* — Peter Helvey
(74) *Attorney, Agent, or Firm* — Haynes & Boone, LLP

(57) ABSTRACT

Described herein is a reusable, multi-purpose bag, comprising a flexible, resiliently deformable body comprising a first material and a second material. The first material has a first degradation temperature and an absorption ratio of at least two to one of absorbed water weight to bag weight. The first material forms an anterior panel and a posterior panel, and the anterior panel is coupled to the posterior panel to define a cavity therebetween. The second material has a second degradation temperature that is lower than the first degradation temperature, and at least a portion of the anterior panel is bonded to at least a portion of the posterior panel by the second material.

29 Claims, 11 Drawing Sheets

(51) Int. Cl.
*B65D 33/06* (2006.01)
*B65D 30/20* (2006.01)

(56) References Cited

U.S. PATENT DOCUMENTS

| | | |
|---|---|---|
| 1,726,740 A | 9/1929 | Joffe |
| 3,255,951 A | 6/1966 | Kay |
| 3,462,069 A | 8/1969 | Suominen |
| 3,468,470 A | 9/1969 | Sengewald |
| 3,506,185 A | 4/1970 | Christensen |
| 3,938,659 A | 2/1976 | Wardwell |
| 4,059,222 A | 11/1977 | Gamble |
| D258,204 S | 2/1981 | Rudenschold |
| 4,759,639 A | 7/1988 | DeMatteis |
| 4,797,010 A | 1/1989 | Coelho |
| 5,065,868 A | 11/1991 | Cornelissen et al. |
| 5,165,799 A | 11/1992 | Wood |
| 5,226,858 A | 7/1993 | Snowdon |
| 5,282,686 A | 2/1994 | Haber |
| 5,338,118 A | 8/1994 | DeMatteis |
| 5,437,406 A | 8/1995 | Gordon et al. |
| 5,789,368 A | 8/1998 | You et al. |
| 5,840,675 A | 11/1998 | Yeazell |
| 5,851,931 A | 12/1998 | DeRenzo et al. |
| 6,110,586 A | 8/2000 | Johnson |
| 6,120,184 A | 9/2000 | Laurence et al. |
| 6,149,007 A | 11/2000 | Yeh et al. |
| 6,199,698 B1 | 3/2001 | Hetrick et al. |
| 7,011,615 B2 | 3/2006 | Price et al. |
| 8,083,409 B2 | 12/2011 | Gelbard |
| 8,197,925 B2 | 6/2012 | Sankey et al. |
| 8,267,580 B2 | 9/2012 | Schneider |
| 2001/0029724 A1 | 10/2001 | DeMatteis |
| 2002/0102032 A1 | 8/2002 | Sturgis et al. |
| 2003/0236159 A1 | 12/2003 | Worthy |
| 2004/0028296 A1 | 2/2004 | Meli |
| 2004/0074803 A1 | 4/2004 | Otsubo et al. |
| 2005/0031228 A1 | 2/2005 | Galomb et al. |
| 2005/0147774 A1 | 7/2005 | Lee |
| 2006/0142721 A1 | 6/2006 | Price |
| 2007/0029001 A1 | 2/2007 | Trouilly et al. |
| 2007/0031067 A1 | 2/2007 | Gebhardt |
| 2008/0031553 A1 | 2/2008 | Tokita et al. |
| 2009/0084321 A1 | 4/2009 | Mo |
| 2010/0021088 A1 | 1/2010 | Wilfong, Jr. |
| 2010/0025456 A1 | 2/2010 | McCann |
| 2010/0028575 A1 | 2/2010 | Vanhamel |
| 2010/0172600 A1 | 7/2010 | Sherrill et al. |
| 2010/0187135 A1 | 7/2010 | Broering et al. |
| 2010/0189380 A1 | 7/2010 | Sargin et al. |
| 2010/0316309 A1 | 12/2010 | Wilfong |
| 2011/0092120 A1 | 4/2011 | Todt et al. |
| 2011/0162989 A1 | 7/2011 | Ducker et al. |
| 2012/0230611 A1 | 9/2012 | Ebner et al. |
| 2012/0294551 A1 | 11/2012 | Ford |

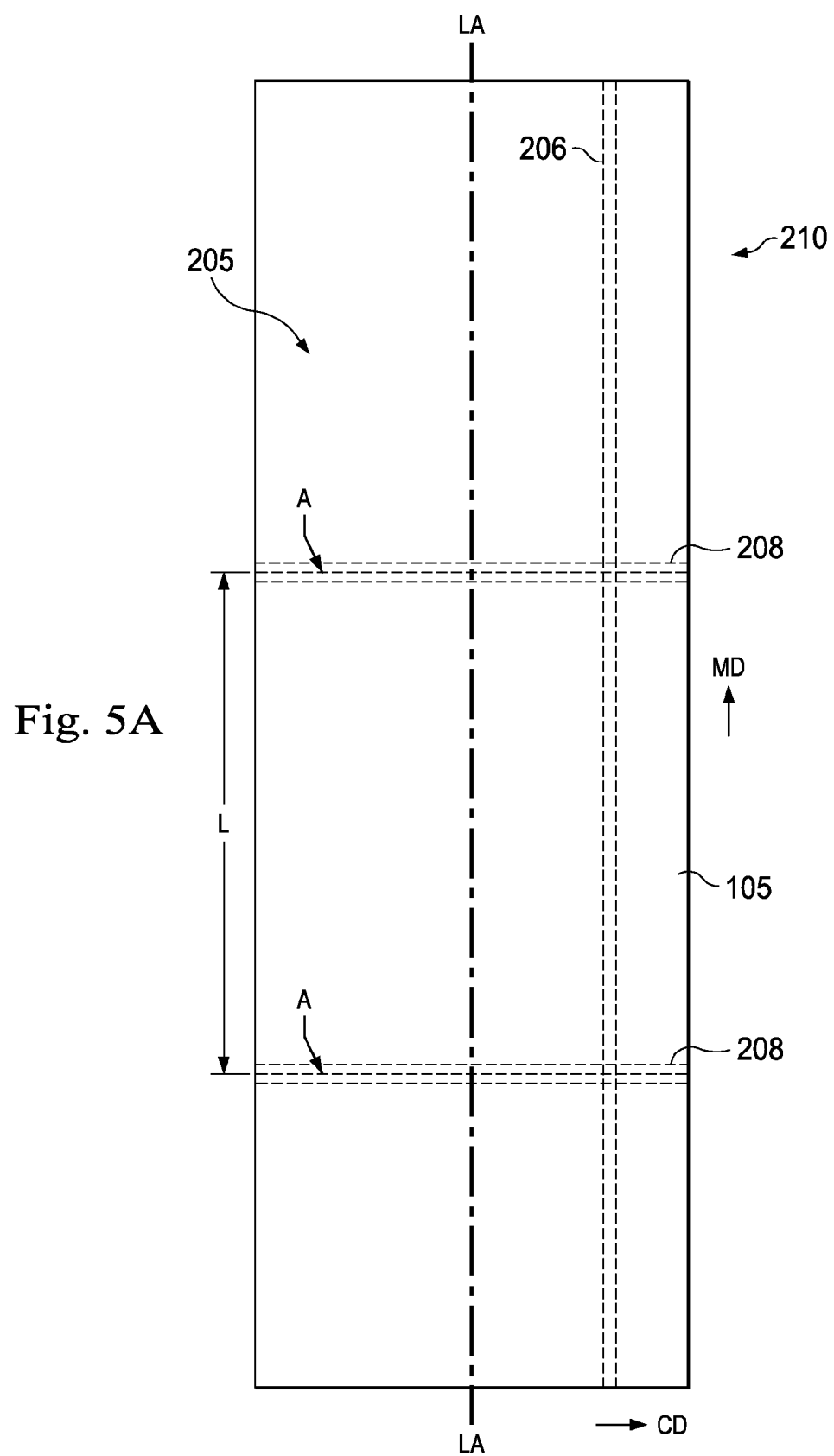

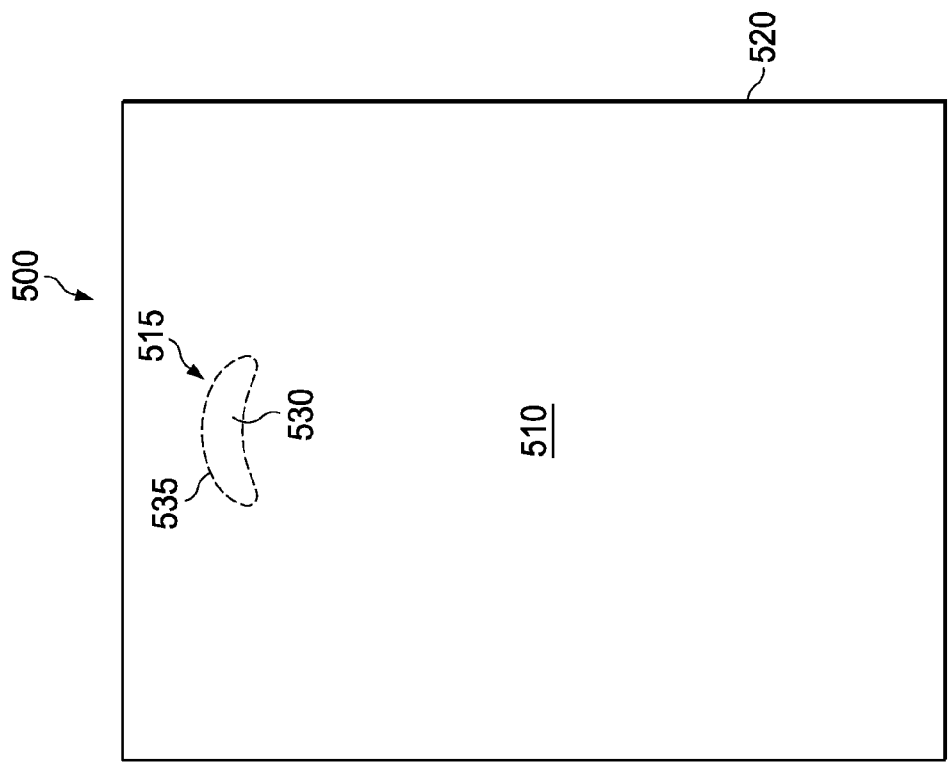
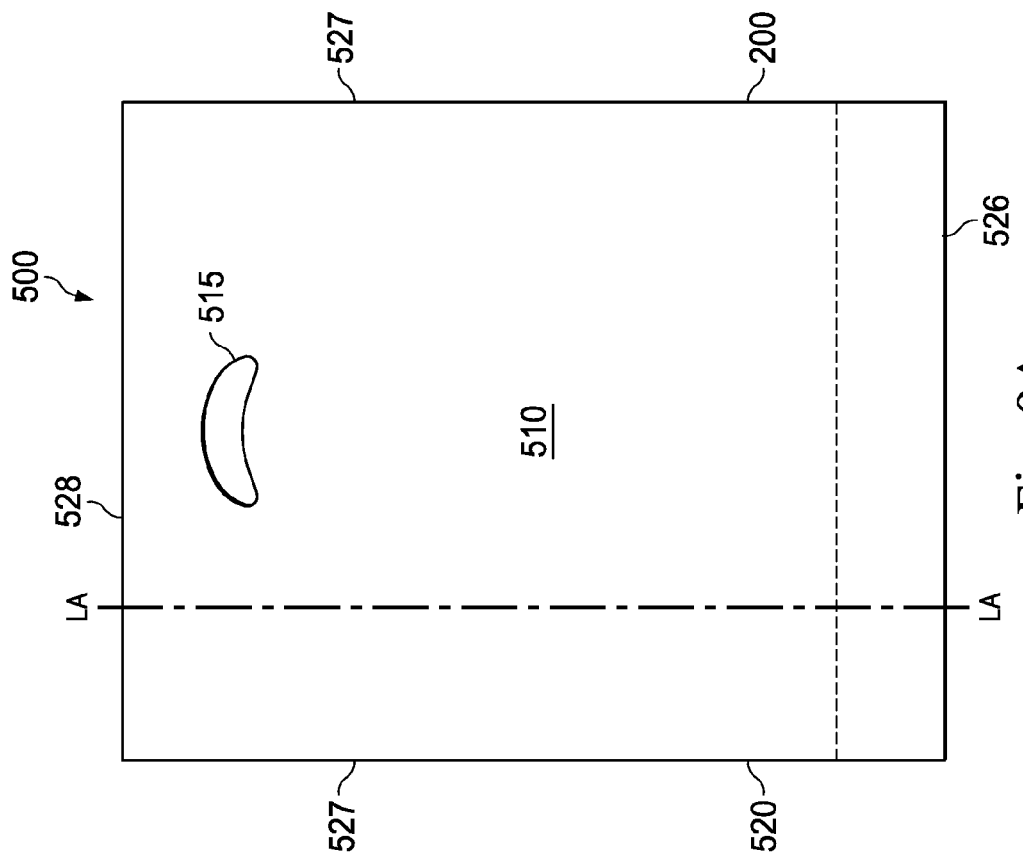
Fig. 9A
Fig. 9B

REUSABLE MULTI-PURPOSE BAG FORMED OF NONWOVEN FIBROUS MATERIAL

CLAIM OF PRIORITY

This patent application claims priority from U.S. Provisional Patent Application No. 61/692,676 entitled "Multipurpose Bag," filed on Aug. 23, 2012, which is incorporated herein by reference in its entirety.

BACKGROUND

The present disclosure relates generally to reusable bags and associated methods of manufacture.

The environmental impact of single use plastic shopping bags as commonly supplied by many supermarkets and shops is well known. Such bags are used in large quantities and are usually too flimsy for repeat usage. Moreover, consumers generally pay little attention to the proper disposal of the bag. The resulting pollution from these single use bags has become a significant concern for many communities, and many communities have banned such bags. Accordingly, alternatives to the single use shopping bags and methods of reducing the environmental impact of shopping bags are keenly sought after.

One possible solution to the issue is the adoption of reusable bags, including reusable bags that can be purchased from the retailer at a cost to the consumer. Such reusable shopping bags are considered a sustainable alternative to using single-use plastic bags when carrying groceries or other purchased items. Typically, reusable bags are made of a durable material and can be reused many times over a given period of time. For example, cloth bags have recently gained popularity for use as reusable shopping bags. However, these bags can be expensive to manufacture, often requiring significant manual labor (e.g., sewing), such that the cost of the reusable bags is often a deterrent to consumers.

Given that the consumers who buy the reusable bags have made an investment in reusable bags, the expectation is that such products will be carefully looked after and maintained. However, many consumers do not appropriately clean or launder conventional reusable bags, and research has shown that reusable bags can harbor harmful bacterial growth after only a few uses.

Also, the reusable bag will eventually wear out and become unusable to the owner as a carrying tool. The typical reusable bag offers no other practical use apart from as a carrying tool. Thus, once the conventional reusable bag has lost its ability to carry items securely, the bag may find its way into a landfill. A more environmentally friendly way of disposing of the bag is to recycle it. However, neighborhood recycling programs generally do not include the recycling of materials typically used in the construction of reusable bags.

Accordingly, there remains a need for less expensive, more useful, and more environmentally friendly reusable bags. The apparatus and methods disclosed herein overcome one or more of the deficiencies of the prior art.

SUMMARY

In one exemplary aspect, this disclosure is directed to a nonwoven fibrous bag having sufficiency absorbency, softness, and flexibility to also function as a rag.

In one aspect, the reusable, multi-purpose bag comprises a flexible, resiliently deformable body comprising a first material and a second material. The first material has a first melting point and the second material has a second melting point. In one aspect, the second melting point is lower than the first melting point. In one aspect, the first material has an absorption ratio of at least two to one of absorbed water weight to bag weight. The first material forms an anterior panel and a posterior panel. The anterior panel is positioned adjacent to the posterior panel to define a cavity therebetween and at least a portion of the anterior panel is bonded to at least a portion of the posterior panel by the second material.

In another exemplary aspect, the present disclosure is directed to a reusable, multi-purpose bag comprising a flexible, resiliently deformable body formed of a nonwoven fibrous material having an absorption ratio of at least two to one of absorbed water weight to bag weight. In one aspect, the body comprises an anterior panel, a posterior panel, and a longitudinal axis. The anterior panel includes a first upper edge and a first lower edge, and the posterior panel includes a second upper edge and a second lower edge. The longitudinal axis extends from the first upper edge to the first lower edge. In one aspect, the anterior panel is coupled to the posterior panel to define a cavity therebetween by a bonding agent applied between the anterior panel and the posterior panel. In one aspect, the bonding agent is different than the nonwoven fibrous material. In one aspect, the bag includes an opening between the first upper edge and the second upper edge, with the opening being in communication with the cavity. In one aspect, the bag includes a handle disposed on the body. In one aspect, the fibrous material comprises a non-woven mixture of polymer fibers and pulp fibers.

In another exemplary embodiment, the present disclosure is directed to a reusable, multipurpose bag comprising a flexible, resiliently deformable body formed of a nonwoven fibrous material and a bonding agent. In one aspect, the fibrous material has an absorption ratio of at least two to one of absorbed water weight to bag weight. The anterior panel includes a first upper edge and a first lower edge, and the posterior panel includes a second upper edge and a second lower edge. The longitudinal axis extends from the first upper edge to the first lower edge. In one aspect, the anterior panel is coupled to the posterior panel to define a cavity therebetween by a bonding agent disposed between the anterior panel and the posterior panel to seal the anterior panel to the posterior panel. In one aspect, the bonding agent has a lower melting point than the nonwoven fibrous material and the bonding agent melts onto the nonwoven fibrous material and bonds the anterior panel to the posterior panel. In one aspect, the bag includes an opening between the first upper edge and the second upper edge, and the opening is in communication with the cavity. In one aspect, the bag includes a handle.

In another exemplary embodiment, the present disclosure is directed to a reusable, multipurpose bag comprising a flexible, resiliently deformable body formed of a nonwoven fibrous material and a bonding agent. In one aspect, the anterior panel includes a first upper edge and a first lower edge, and the posterior panel includes a second upper edge and a second lower edge. In one aspect, a longitudinal axis extends from the first upper edge to the first lower edge. In one aspect, the anterior panel is coupled to the posterior panel to define a cavity therebetween. In one aspect, the bonding agent is disposed between the anterior panel and the posterior panel to seal the anterior panel to the posterior panel. In one aspect, the bonding agent has a lower melting point than the nonwoven fibrous material. In one aspect, the bag includes an opening between the first upper edge and the second upper edge, and the opening is in communication with the cavity. In one aspect, the bag includes a handle disposed on the body and spaced from the first and second lower edges along the longitudinal axis in parallel with a machine direction of the material, wherein the handle incorporates at least one of the first upper edge and the second upper edge and is disposed on a sidewall formed adjacent where the anterior panel is longitudinally coupled to the posterior panel.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

The accompanying drawings illustrate embodiments of the devices and methods disclosed herein and together with the description, serve to explain the principles of the present disclosure.

FIG. 5A illustrates an exemplary method of creating seals within a sheet of fibrous material according to the principles of the present disclosure.

FIG. 9A illustrates a front view of a reusable bag in accordance with one embodiment of the present disclosure.

FIG. 9B illustrates a front view of the reusable bag shown in FIG. 9A (in an unfinished state) in accordance with one embodiment of the present disclosure.

DETAILED DESCRIPTION

Figure 1:
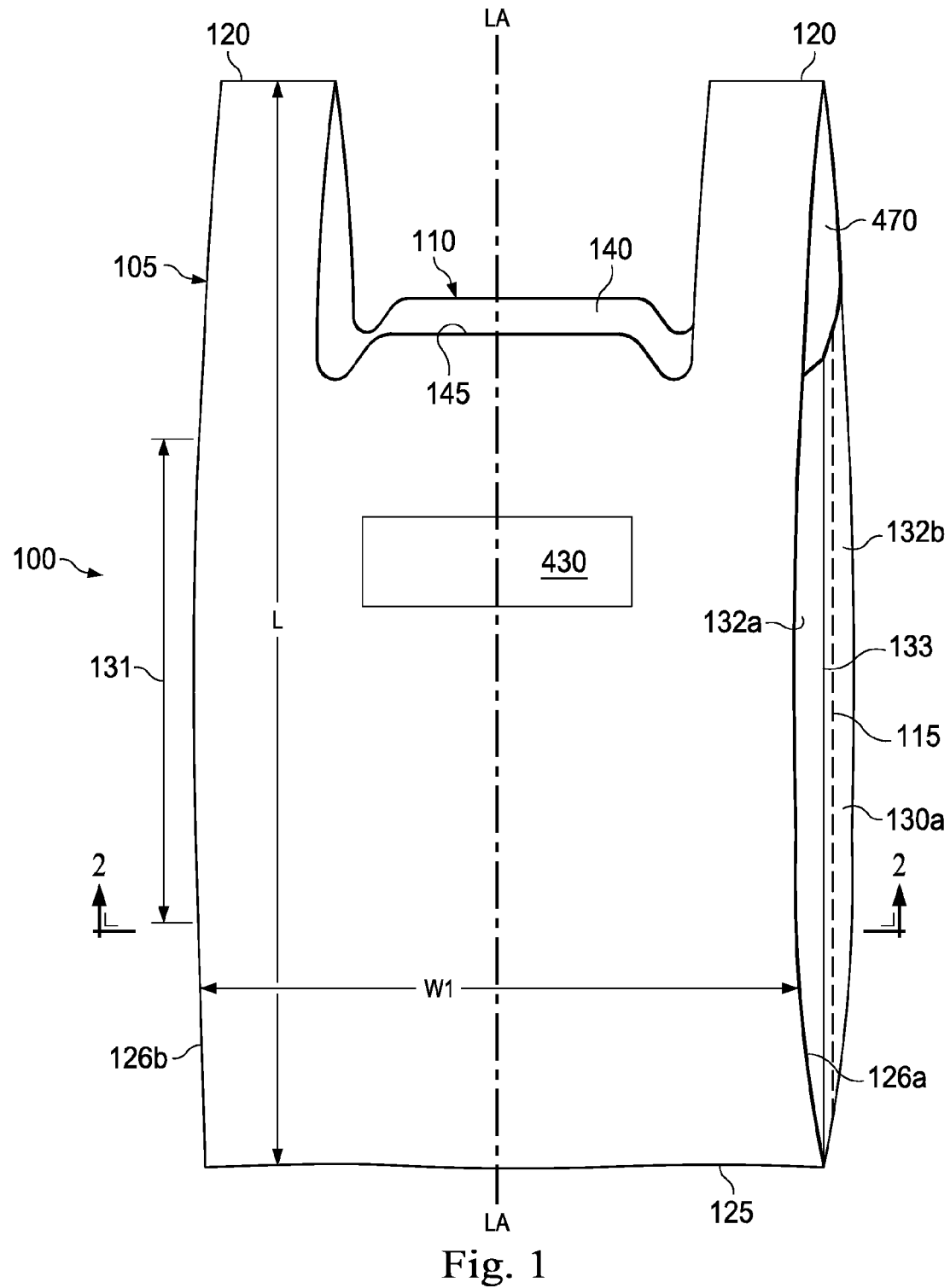
FIG. 1 illustrates a perspective view of a reusable bag in accordance with one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately. For simplicity, in some instances the same reference numbers are used throughout the drawings to refer to the same or like parts.

The present disclosure relates generally to a reusable, multi-purpose bag. In some instances, embodiments of the present disclosure are configured to be relatively inexpensive, reusable, multi-purpose bags. In one aspect, the reusable bags disclosed herein are made of a non-woven fibrous material. In one aspect, the reusable bags disclosed herein are made of a non-woven composite fibrous material containing, by way of non-limiting example, a mixture of polyester and wood pulp. In some instances, embodiments of the present disclosure comprise reusable retail shopping bags that are may be printed upon. In one aspect, the bags disclosed herein are capable of holding heavy loads, while being suitably lightweight and compact for everyday usage. In some instances, embodiments of the present disclosure are configured to be not only environmentally friendly and biodegradable, but also compostable. In some embodiments, the reusable bags disclosed herein are made of a material that enables them to be reused for purposes other than carrying implements once they have exhausted their usefulness as bags. For example, in some instances, the reusable bags disclosed herein may be repurposed as reusable cleaning rags that may be washing, rinsed, and/or sanitized between uses. Thus, the present disclosure is directed to a nonwoven fibrous bag having sufficiency absorbency, softness, and flexibility to also function as a rag.

Figure 3A:
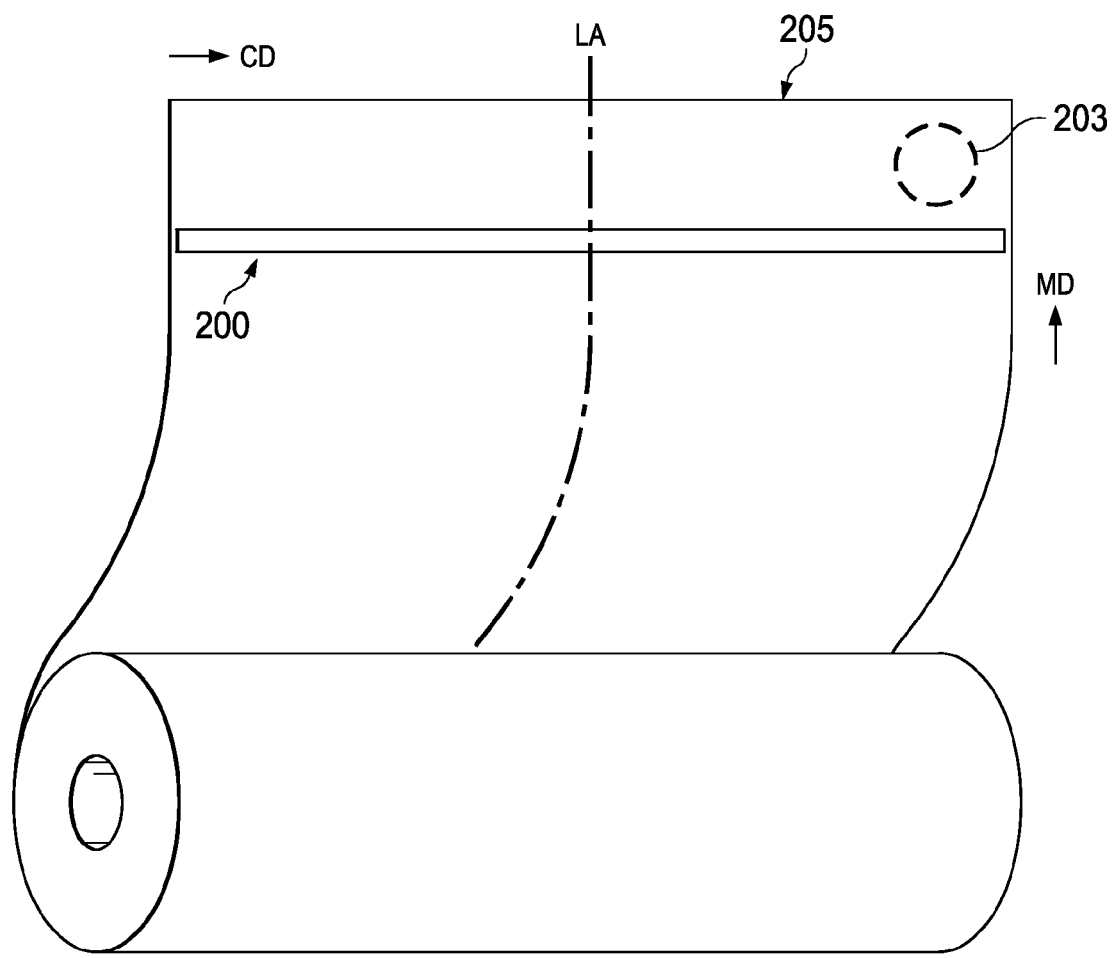
FIG. 3A illustrates an exemplary method of applying adhesive to a sheet of fibrous material in a cross-machine direction according to the principles of the present disclosure.
Figure 3B:
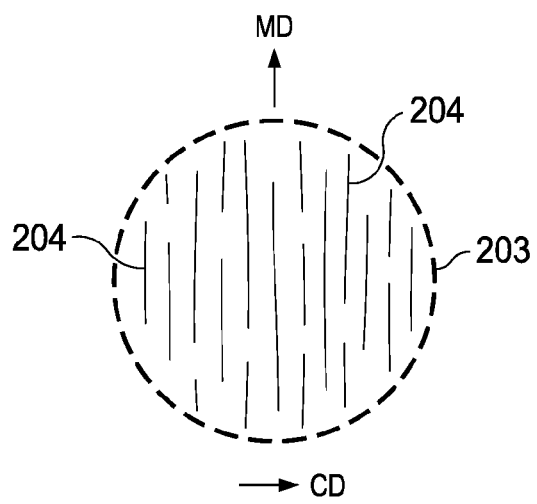
FIG. 3B illustrates an enlarged view of a portion of the sheet of fibrous material shown in FIG. 3A.

The term "machine direction," as shown by the arrow MD in FIG. 3B and as used herein refers to the direction of travel of the forming surface onto which fibers are deposited during formation of a nonwoven web or sheet of fibrous material.

The term "cross-machine direction" or "cross direction" or "cross web direction," as shown by the arrow CD in FIG. 3B and as used herein refers to the direction which is generally perpendicular to the machine direction defined above.

FIG. 1 illustrates a perspective view of a reusable bag 100 in accordance with one embodiment of the present disclosure. In the pictured embodiment, the bag 100 is relatively symmetrical about a central longitudinal axis LA. In some embodiments, the longitudinal axis LA of the bag 100 is parallel to the machine direction of the material used to make the bag 100. In the pictured embodiment, the bag 100 comprises a generally rectangular bag including an anterior panel 105 and a posterior panel 110. Other embodiments may comprise any of a variety of shapes, including, by way of non-limiting example, oblong or square bags. In the pictured embodiment, an edge 111 (not shown) of the anterior panel 105 and an edge 112 (not shown) of the posterior panel 110 are coupled to form a side seam 115, an upper edge 120, and a lower edge 125. The edge 111 and the edge 112 may be overlapped to create the side seam 115. The side seam 115 forms the longitudinal junction of the anterior panel 105 and the posterior panel 110.

In the pictured embodiment, the anterior panel 105 and the posterior panel 110 have substantially the same dimensions. The bag 100 includes a longitudinal length L extending from the upper edge 120 to the lower edge 125. In some embodiments, the length L may range from 4 to 60 inches. In one particular embodiment, for example, the length L may be 22 inches. The bag 100 includes a width W1 extending from an anterior edge 126a to an opposite anterior edge 126b. In some embodiments, the width W1 may range from 4 to 42 inches. In one particular embodiment, for example, the width W1 may be 19 inches. The above dimensions are provided for illustrative purposes only, and other dimensions are contemplated.

In the pictured embodiment, the reusable bag 100 includes a sidewall 130a and an opposite sidewall 130b (not shown). As shown more clearly in FIG. 2, which illustrates a perspective, cross-sectional view of a central portion 131 of the bag 100, the sidewalls 130a, 130b comprise gusseted or inwardly folded portions of the bag 100. The sidewall 130a is formed by a portion of the anterior panel 105 and a portion of the posterior panel 110 that is coupled together along the side seam 115. In the pictured embodiment, the sidewalls 130a, 130b comprise initially V-shaped or concave panels which are folded inwardly at the side edges 126a, 126b, respectively so as to lie between the anterior panel 105 and the posterior panel 110 when the bag 100 is flat, but which open out so as to provide the bag 100 with essentially flat or convex side surfaces when the bag 100 is filled. For example, the sidewall 130a comprises a pair of generally rectangular subpanels 132a, 132b folded along a gusset valley 133 so as to form a flattened "V" when the bag is flat, but which are unfolded to form an essentially flat or convex side surface of the bag 100 when the bag is filled. Thus, the sidewalls 130a, 130b will open out (e.g., expand) naturally when the bag 100 is filled to provide well defined side surfaces. In the pictured embodiment, the side seam 115 is disposed apart from the gusset valley 133. In other embodiments, the side seam 115 lies within the gusset valley 133.

In various embodiments, the anterior panel 105 and the posterior panel 110 may be coupled in a variety of ways to create differently configured bags. For example, in some embodiments, the anterior panel 105 and the posterior panel 110 may join at the side seam 115 without the gusseting that forms the sidewalls 130a, 130b. Thus, these embodiments lack the sidewalls 130a, 130b. Examples of such embodiments are discussed in greater detail below with reference to FIGS. 9A-10B. Regardless of the particular configuration, the reusable bag 100 is shaped and configured as a flexible bag that is resiliently deformable, i.e., the bag may be folded and crumpled without permanent deformation. In some embodiments, the reusable bag 100 is porous to water (e.g., water may be absorbed by the bag and water may flow through the bag to some extent).

The anterior panel 105, the posterior panel 110, and the sidewalls 130a, 130b define a cavity 140 within the bag 100. In the pictured embodiment, the anterior panel 105 and the posterior panel 110 are shaped and configured to define an opening or mouth 145 extending into the cavity 140. The opening 145 may be shaped in any of a variety of shapes, including, by way of non-limiting example, an irregular polygon, a polygon, and an arcuate curve. The cavity 140 exists as a potential space within the bag 100 when the bag is in a flat, unexpanded condition. As a user fills the cavity 140 by putting various items into the bag 100 through the opening 145, the cavity 140 expands to accommodate the items. As described above, the sidewalls 130a, 130b open out so as to provide the bag 100 with essentially flat or convex side surfaces when the cavity 140 is filled. Thus, the gusseting and sidewalls 130a, 130b effectively increase the potential volume of the cavity 140.

The upper edges 120 of the bag 100, which frame the opening 145, are formed by the horizontal coupling of the anterior panel 105 and the posterior panel 110 at the upper region of each panel. Similarly, the lower edge 125 of the bag 100 is formed by the horizontal coupling of the anterior panel 105 and the posterior panel 110 at the lower region of each panel. As described above, the side seam 115 is formed by the longitudinal coupling of the anterior panel 105 and the posterior panel 110. Such coupling may be accomplished by any of a variety of fixed coupling mechanisms including, by way of non-limiting example, adhesive, including polymer adhesive and double-sided tape, melt-bonding, ultrasonic sealing means, heat sealing means (e.g., using polymers, polythenes, or other plastic coatings or plies), or any other suitable bonding arrangement capable of securely sealing the anterior panel 105 to the posterior panel 110.

For example, in some embodiments, such as the one illustrated in FIG. 1, the anterior panel 105 is sealed to the posterior panel 110 at the upper edges 120, the lower edge 125, and/or the side seam 115 via a bonding agent 200. This is in contrast to typical plastic shopping bags, which are formed by heat-sealing one layer of plastic directly to the other without an intervening bonding agent. In some embodiments, the bonding agent 200 comprises a polymer containing a high concentration of ethylene vinyl acetate (EVA). In alternative embodiments, the bonding agent 200 comprises a polymer containing a high concentration of polyvinyl acetate (PVA). In alternative embodiments, the bonding agent 200 comprises a polymer containing a high concentration of polylactic acid (PLA). For example, in one embodiment, the fibrous material of the reusable bag 100 comprises viscose and the bonding agent 200 comprises PLA. In alternative embodiments, the bonding agent 200 comprises a polymer containing a high concentration of ethylene methyl acrylate copolymer resin (EMAC resin). In alternative embodiments, the bonding agent 200 comprises EVA, PVA, or EMAC itself. In some embodiments, the bonding agent 200 comprises a bioplastic or biopolymer. The bonding agent 200 is stable in both hot and cold conditions.

Figure 4:
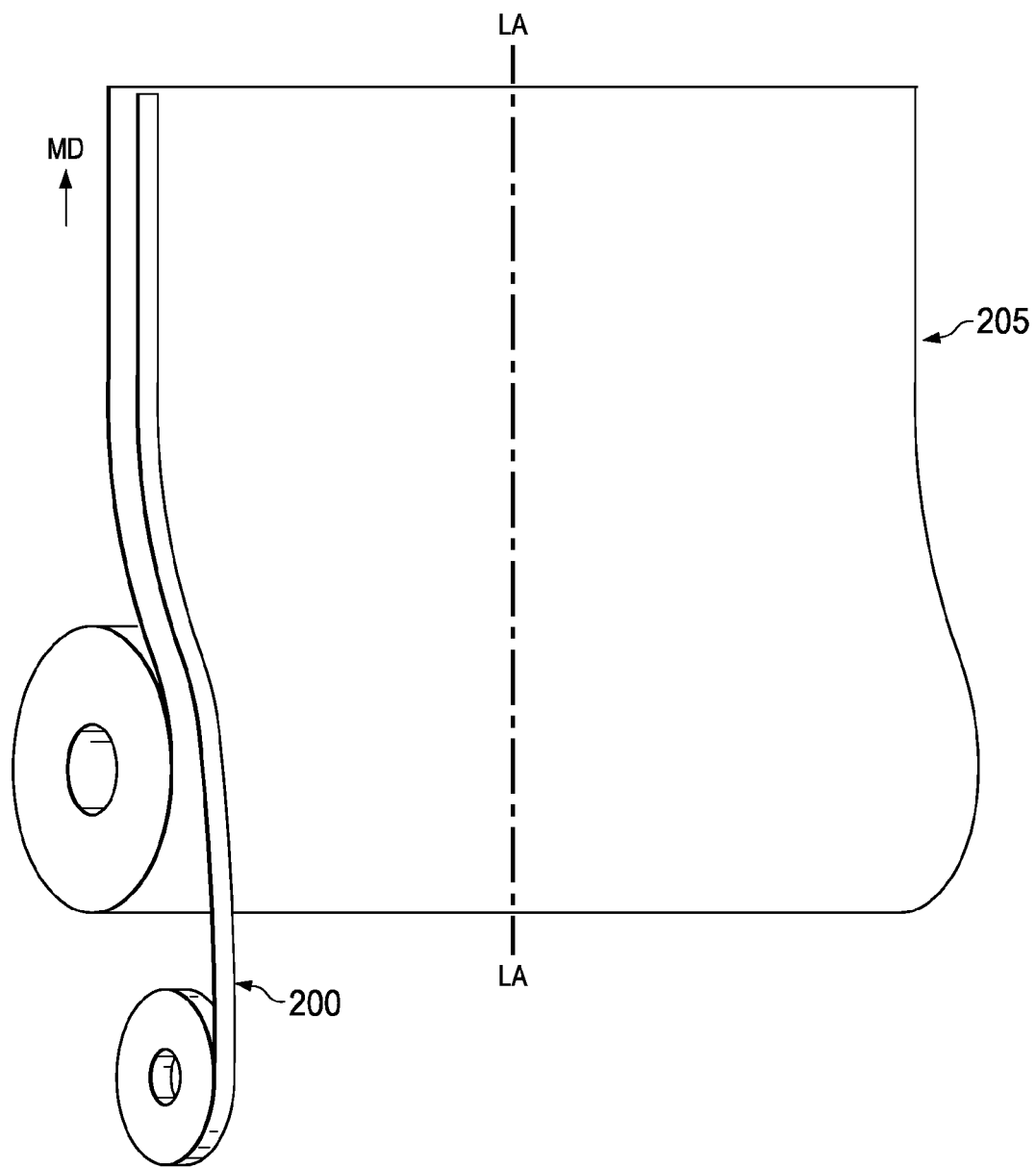
FIG. 4 illustrates an exemplary method of applying adhesive to a sheet of fibrous material in a machine direction according to the principles of the present disclosure.

As shown in FIGS. 3A-4, a strip of the bonding agent 200 may be deposited on a sheet of material 205 during the manufacturing process of creating the bag 100. In FIG. 3A, the bonding agent 200 is deposited substantially perpendicular to the longitudinal axis LA of the sheet 205, or substantially parallel to the cross direction CD of the sheet of material 205. As shown in FIG. 3B, which illustrates an enlarged portion 203 of the sheet of material 205, the fibers 204 of the material 205 of the reusable bag 100 are oriented substantially in parallel to the machine direction MD of the sheet of material 205. As indicated by FIGS. 3a and 3b, the cross direction CD of the sheet of material 205 extends substantially perpendicular to the machine direction MD. In FIG. 4, the bonding agent 200 is deposited along the longitudinal axis LA of the sheet of material 205. In other words, the bonding agent 200 is deposited substantially parallel to the machine direction MD of the sheet of material 205.

In some instances, with reference to FIG. 1, the anterior panel 105 is sealed to the posterior panel 110 at the upper edges 120, the lower edge 125, and/or the side seam 115 by melting strips of the bonding agent 200 between the anterior panel 105 and the posterior panel 110. An alternative methods of coupling or sealing the upper edges 120, the lower edge 125, and/or the side seam 115 of the bag 100 includes using a sufficient quantity of EVA (or PVA or PLA) to saturate each section (e.g., defined by the area covered by the bonding agent 200) of the anterior panel 105 and the posterior panel 110 to be attached. Another alternative method includes using hot melt glue to attach the upper edges 120, the lower edge 125, and/or the side seam 115 of the bag 100. These exemplary methods are presented for the sake of illustration only, and are not meant to be limiting. Other methods of sealing the upper edges 120, the lower edge 125, and/or the side seam 115 of the bag 100 are also contemplated.

In one exemplary method in accordance with the principles of the present disclosure, as shown in FIG. 5A, the upper edges 120 and the lower edge 125 of the bag 100 (shown in FIG. 1) are created in a sequence of steps involving the creation of a "tube" of material 205. The material 205 may be folded upon itself and the over-lapping edges bonded by applying a strip 206 of the bonding agent 200 along the longitudinal axis LA of the fibrous material 205 in the machine direction indicated by the arrow MD to create a tube 210. The tube 210 of material 205 may be divided into bag compartments or individual bags 100 by applying strips 208 of bonding agent 200 substantially perpendicular to the machine direction MD of the fibrous material 205 (e.g., substantially parallel to the cross direction CD of the fibrous material 205). In some instances, the bonding agent 200 is heat-sealed to the sheet of fibrous material 205 (e.g., as both the bonding agent 200 and the sheet of material 205 are unwound).

In some embodiments, the bonding agent 200 comprises a melt-bonding agent rather than a true adhesive. In particular, the bonding agent 200 melts with heat and bonds different parts of the fibrous material 205 together as it hardens (e.g., after the removal of the heat source and as the bonding agent 200 cools). The bonding agent 200 preferably has a lower melting point or degradation temperature than the polymers within the fibrous material 205 so that the bonding agent 200 melts during the sealing process before the fibrous material 205 degrades. The bonding agent 200 may have a softening temperature (e.g., the vicat softening temperature) ranging from 120 degrees F. to 160 degrees F. For example, in one embodiment, the bonding agent has a softening temperature of 140 degree F. (60 degrees C.). The bonding agent 200 may have a melting point or degradation temperature ranging from 160 degrees F. to 200 degrees F. For example, in one embodiment, the bonding agent has a melting point of 180 degree F. (82 degrees C.). In another embodiment, the bonding agent has a melting point of 190 degree F. (88 degrees C.). The bonding agent 200 may have a seal initiation temperature ranging from 135 degrees F. to 175 degrees F. For example, in one embodiment, the bonding agent has a seal initiation temperature of 155 degree F. (68 degrees C.). In some embodiments, the bonding agent 200 maintains strength and flexibility within temperatures ranging from hot to cold. In some instances, the bonding agent 200 comprises a strip of adhesive or bonding agent. In other instances, the bonding agent 200 comprises a liquid adhesive bonding agent.

The tube or tubular structure 210 comprises multiple anterior panels 105 (e.g., one hemi-cylinder of the tubular structure) and multiple posterior panels 110 (e.g., the remaining hemi-cylinder of the tubular structure). In some embodiments, the predetermined intervals may be substantially equal to the desired length L of each bag 100. After creating the tubular structure 210, the process may continue by securing (e.g., heat-sealing) the anterior panels 105 to the posterior panels (e.g., the two hemi-cylinders of the tubular structure 210) along the cross-directional strips 208.

Figure 2:
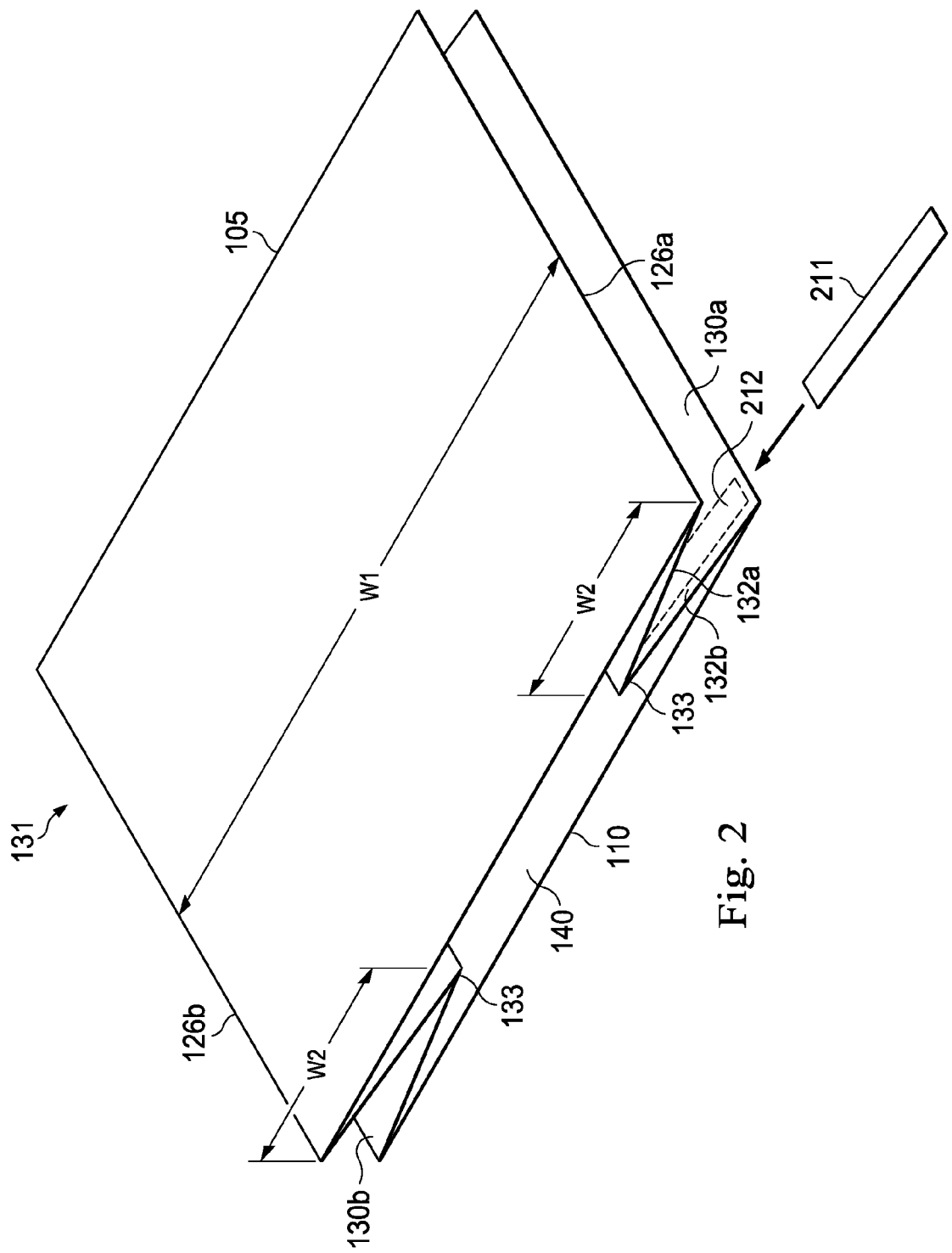
FIG. 2 illustrates a partial perspective view of a middle gusseted portion of the reusable bag shown in FIG. 1 taken along line 2-2 in accordance with one embodiment of the present disclosure.

In some embodiments, the process includes the step of creating side gussets. As shown in FIG. 2, the bag 100 may be gusseted by applying a discrete strip 211 of the bonding agent 200 along a portion 212 of the sidewall 130a and sealing the subpanel 132a to the subpanel 132a along the strip 211. Thus, the strip 211 of the bonding agent 200 is applied to an exterior surface 214 of the bag 100 to seal the gusset. Similar steps may be performed on the sidewall 130b to create a second gusset.

In bags 100 produced by the method illustrated in FIG. 5A, the upper edges 120 and the lower edge 125 are sealed (e.g., heat-sealed or melt-bonded) by the cross-directional strips 208. In particular, the tubular structure 210 of the material 205 may be cut (e.g., with a guillotine cutter) across the cross-directional strips 208, as indicated by the dotted lines A, to produce multiple bags 100. In the pictured embodiment, each cross-directional strip 208 comprises the upper edges 120 of one bag 100 as well as the lower edge 125 of the adjacent bag 100. In the pictured embodiment, each machine direction strip 206 comprises the side seam 115 of the reusable bag 100. In other embodiments, each cross directional strip 208 eventually comprises the side seams 115 of the bag 100.

Figure 5B:
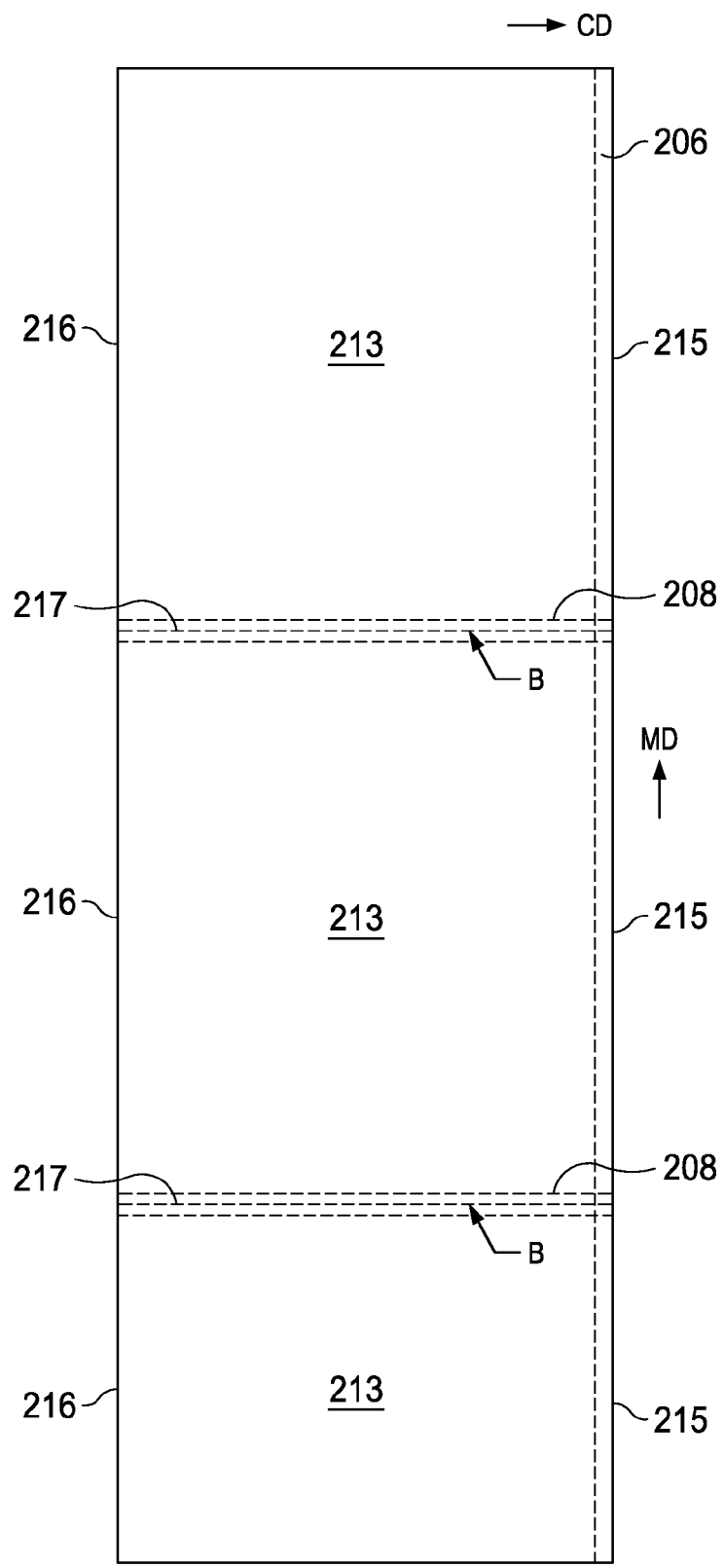
FIG. 5B illustrates another exemplary method of creating seals within a sheet of fibrous material according to the principles of the present disclosure.

For example, in another exemplary method, as shown in FIG. 5B, the material 205 may be folded upon itself and the edges bonded by applying a strip 206 of the bonding agent 200 along the longitudinal axis LA of the fibrous material 205 in the machine direction indicated by the arrow MD to create a tube 210. In some embodiments, the edges bonded by the longitudinal strip 206 ultimately form upper edges 215 of a reusable bag 213. The reusable bag 213 is substantially similar to the reusable bag 100 except for the differences described herein. In the pictured embodiment, the reusable bag 213 includes a folded lower edge 216. The sheet of material 205 may be divided into bag compartments or individual bags 213 by applying the strips 208 of bonding agent 200 substantially perpendicular to the machine direction MD of the fibrous material 205 (e.g., substantially parallel to the cross direction CD of the fibrous material 205). In some instances, the bonding agent 200 is heat-sealed to the sheet of fibrous material 205 (e.g., as both the bonding agent 200 and the sheet of material 205 are unwound).

The process may continue by securing (e.g., heat-sealing or melt-bonding) the anterior panels to the posterior panels (e.g., the two folded portions of the material 205) along the bonding agent strips 206, 208. In bags 213 produced by the method illustrated in FIG. 5B, the upper edges 215 and side seams 217 are sealed by the cross directional strips 208. In particular, the material 205 may be cut (e.g., with a guillotine cutter) across the cross-directional strips 208, as indicated by the line B, to produce multiple bags 213. In the pictured embodiment, each cross directional strip 208 eventually comprises the side seams of the bag 213, and the longitudinal or machine direction strip 206 may eventually comprise the upper edge 215. In some embodiments, the process includes the step of creating side gussets.

Figure 6:
FIG. 6 illustrates a front view of a reusable bag having an open top in accordance with one embodiment of the present disclosure.

In some instances, embodiments of the present disclosure are configured to be flat top bags having an open top as shown in FIG. 6. FIG. 6 illustrates a reusable bag 300 including an open upper edge 305. The bag 300 is substantially similar to the bag 100 except for the differences described herein. The bag 300 is open at the upper edge 305, and a cavity 310 (not shown) is generally open and accessible to the user. In some embodiments, the bag 300 includes a gusseted bottom edge 315. In some instances, the bottom edge 315 may be gusseted in a similar manner as described above with reference to the gusseted sides of the bag 100 shown in FIGS. 1 and 2.

Figure 7:
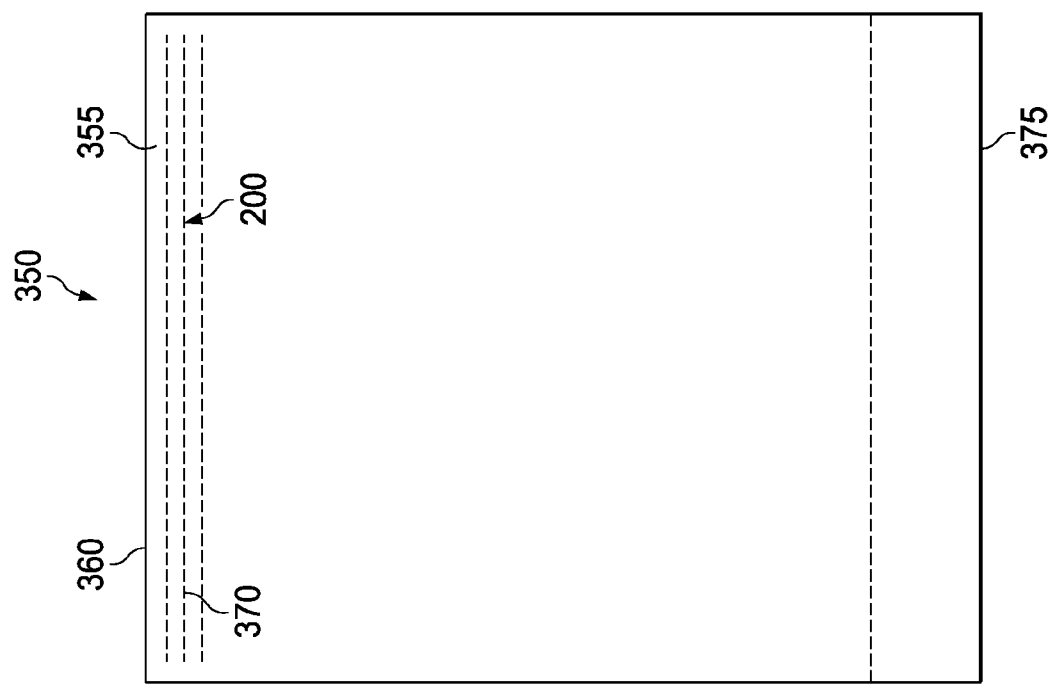
FIG. 7 illustrates a front view of a reusable bag having a sealable top in accordance with one embodiment of the present disclosure.

In other instances, embodiments of the present disclosure are configured to be resealable bags as shown in FIG. 7. FIG. 7 illustrates a reusable bag 350 including a sealable upper area 355 adjacent to an upper edge 360. The bag 350 is substantially similar to the bag 100 except for the differences described herein. In some embodiments, the bag 350 is resealable at the upper area 355 (e.g., the upper area 355 may be disposed at or adjacent to the opening of the bag 350, which may be the same as the opening 140 of the bag 100). In some embodiments, the bag 350 includes a strip 370 of the bonding agent 200 disposed within the bag 350 along the upper area 355. In some embodiments, this enables the bag 350 to be used for packaging purposes. In particular, items can be placed inside a cavity 365 (not shown) inside the bag and the bag can then be sealed using, by way of non-limiting example, standard heat-sealing equipment. In other embodiments, the bonding agent 200 may be configured to allow the user to selectively open and close (i.e., open and reseal) the bag 350 to access the cavity 365. In some embodiments, the bag 300 includes a gusseted bottom edge 375. In some instances, the bottom edge 375 may be gusseted in a similar manner as described above with reference to the gusseted sides of the bag 100 shown in FIGS. 1 and 2.

Several factors affect the strength, durability, absorbency, and other physical characteristics of the reusable bag 100, including, without limitation, the seals of the bag 100, the material composition of the bag 100, the shape and design of the bag (e.g., gussets and handles), the directionality of the bag 100 (e.g., machine direction or cross-machine direction relative to its weight-bearing axis). The seals and the gusseting of the bag 100 are discussed above with reference to FIGS. 1-7. The remaining factors are discussed in greater detail in the following discussion.

As mentioned above, the reusable bag 100 is made of the fibrous material 205. In some embodiments, the reusable bag 100 is made entirely of the fibrous material 205. In at least one embodiment, the fibrous material 205 comprises a composite material formed of a non-woven fabric or web made from a mixture of synthetic material (e.g., polyester) and pulp. The term "pulp" as used herein refers to fibers from natural sources such as woody and non-woody plants. Woody plants include, for example, deciduous and coniferous trees. Non-woody plants include, for example, cotton, flax, esparto grass, milkweed, straw, jute hemp, and bagasse. However, other non-woven fabrics may be used to achieve the objectives of the present disclosure. Examples of other non-woven materials include, without limitation, spun-lace material, polypropylene, polyethelene, polylactic acid, polyester, Tyvek, polyethelene terephthalate (PET), cotton, and paper.

In some embodiments, the fibrous material 205 comprises a non-woven fabric made from a mixture of non-woven polymer fibers and pulp fibers. Examples of materials that can be used to form the fibers include, without limitation, viscose, polyethylene, polypropylene, polyamide, and cellulose pulp. In particular, in one embodiment, the fibrous material is made of a mix of paper-like wood fiber pulp and a polymer fiber material. The polymer fiber material may comprise, by way of non-limiting example, a polyester, such as, by way of non-limiting example, polylactic acid (PLA). In one instance, the fibrous material 205 is formed by laminating the pulp to the polyester via water lace bonding or hydroentanglement. In an alternative embodiment, the fibrous material 205 comprises a synthetic pulp, such as, by way of non-limiting example, polyethelene terephthalate (PET). In some embodiments, the fibrous material 205 includes fibers from recycled materials including, by way of non-limiting example, plastics and wood fibers.

The ratio of pulp to the other material can affect the strength-bearing capabilities and other physical characteristics of the reusable bag 100. The percentage of pulp (e.g., wood fiber pulp) in the fibrous material 205 influences the strength of the fibrous material 205 (and, thus, the strength of the reusable bag 100) as well as the absorbency. In general, the more pulp material contained in the fibrous material 205, the weaker the fibrous material 205. In some embodiments, the ratio of polymer fibers to pulp fibers in the fibrous material is configured to optimize the strength or the absorbency of the bag. In alternative applications, the ratio of polymer fibers to pulp fibers in the fibrous material is configured to optimize the strength and the absorbency of the bag. For applications in the field of carrying bags and cleaning rags, the fibrous material 205 may have a weight/surface ratio between 30 gsm (grams per square meter) and 100 gsm. In one embodiment, the reusable bag 100 may be composed of a fibrous material 205 having a weight of 60 gsm.

In some instances, the weight of the fibrous material 205 can be adjusted (e.g., be made 30 g heavier) depending upon the strength requirements of the reusable bag 100. In one embodiment, for medium weight 60 gsm material, it may be desirable to use approximately 35 g pulp (e.g., wood fiber pulp) and 25 g of polyester (or a ratio of 7:5 of pulp:polymer). The pulp to polymer ratios may range from 8:1 in low load bearing designs to as high as 3:5 in high load bearing designs. During the manufacturing process, water pressure can be utilized to help create material strength by bonding the shorter pulp fibers to the longer polymer fibers (e.g., through spun lace bonding and/or hydroentanglement).

The percentage of pulp (e.g., wood fiber pulp) in the fibrous material 205 influences the absorbability of the fibrous material 205 (and, thus, the absorbability of the reusable bag 100). In general, the more pulp material contained in the fibrous material 205, the high the absorbency of the fibrous material 205. In some instances, it is desirable to have a material absorbency potential that is approximately five times the weight of the material. For example, in one instance, 1 square meter of a 60 gsm fibrous material may be able to absorb at least 300 g of water. Thus, both the desired strength and the desired absorbability of the reusable bag 100 may be taken into account when determining the appropriate ratio of pulp to polymer to use in forming the fibrous material 205.

It is important to note that in at least some embodiments, the fibrous material 205 is both biodegradable and compostable. In other words, in at least some embodiments, the fibrous material 205 is able to break down into carbon dioxide, water and biomass at the same rate as paper material. Also, in at least some embodiments, the fibrous material is capable of degrading without producing any toxic material and is able to support plant life.

In some embodiments, reusable bag 100 includes antimicrobial properties that enable the destruction of bacteria, viruses, and/or other pathogens. In some instances, the fibrous material 205 itself comprises an antimicrobial, non-woven fabric or web. For example, in some embodiments, the fibrous material 205 may be comprised at least partially of fibers that are either inherently antimicrobial (e.g., bacteriostatic or bacteriocidal) or treated with an antimicrobial agent (e.g., an anionic polyelectrolyte and a cationic antimicrobial agent). In alternative embodiments, the fibrous material 205 may be treated with the antimicrobial agent prior to being manufactured into the reusable bags 100. For example, in one instance, the antimicrobial agent is applied (e.g., sprayed) onto the web of fibrous material 205 during the production of the fibrous material 205 itself. One example of a non-woven material having applied antimicrobial agents is the HyGentic® NW Antimicrobial Nonwoven material manufactured by the BASF Corporation. In alternative embodiments, the reusable bags 100 may be treated with the antimicrobial agent during or after the manufacturing process of transforming the fibrous material 205 into the reusable bags 100. Thus, reusable bags 100 constructed from fibrous material 205 having anti-microbial properties may be more resistant to harboring harmful microorganisms and other pathogens than conventional reusable bags.

The following tables illustrate experimental data reflecting various physical properties of different types of possible fibrous material 205. Table 1 illustrates experimental data obtained from testing of fibrous material composed of Tencel and Viscose non-woven fibers having a weight of 60 G (for example, the Tencel and Viscose non-woven fibers manufactured by Lenzing Group). Fibrous material composed of Tencel and Viscose non-woven fibers Table 2 illustrates experimental data obtained from testing of fibrous material composed of polyethelene terephthalate (PET) and paper pulp non-woven fibers having a weight of 65 gsm.

way of non-limiting example, a drawing, a painting, a photographic representation, a pattern, text, a logo, or a combination thereof. In some embodiments, the printed design 430 is added to the reusable bag 100 by applying the inked design and then applying a layer of overprint-varnish to maintain the integrity of the printing.

Figure 8:
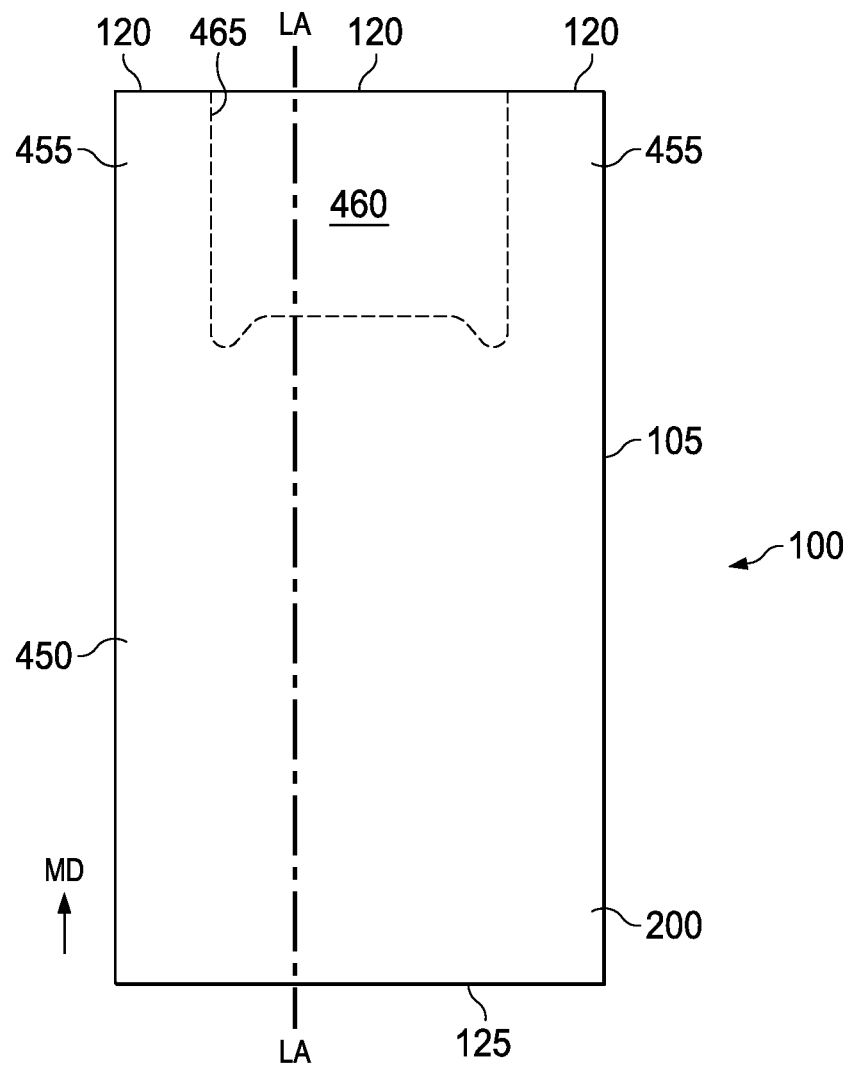
FIG. 8 illustrates a front view of the reusable bag shown in FIG. 1 (in an unfinished state) in accordance with one embodiment of the present disclosure.

FIG. 8 illustrates the reusable bag 100 during a stage of manufacture preceding the formation of handles. As shown, the reusable bag 100 includes a body 450 and two handles 455. In the pictured embodiment, the body 450 and the handles 455 are part of a continuous sheet of material 205. In one instance, the handles 455 are created by cutting out the shape 460 outlined by the dotted line 465 from both the anterior panel 105 and the posterior panel 110 (not shown in

TABLE 1

| Viscose (Tencel by Lenzing), Weight 65 gsm | | | | |
|---|---|---|---|---|
| Tests | Orientation | Unit | Result | Methods |
| Tensile Strength | Machine Direction | Neutons/5 cm | 145 | IN. FR QAL. 103-B |
| | Cross Web Direction | Neutons/5 cm | 46.7 | |
| Elongation | Machine Direction | % | 18 | |
| | Cross Web Direction | % | 100 | |
| Absorption Capacity | N/A | % | 963 | World Strategic Partners (WSP) |
| Temperature Tolerance of Seal (Degradation Temperature) | N/A | Degrees F. | 750 | Direct Heat thru Element and Thermocoupling |
| When Used with 3 mil EMA Bonding Polymer Ideal Bonding Temperature | N/A | Cycles/Min 120 | Dwell Time MS 0.049 | Temperature 750 |
| Heat Resistance of Fibrous Material (Degradation Temperature) | N/A | Degrees F. | 480 | Temperature at which fibrous material shows signs of degradation after 5 minutes (e.g., curling or fibers shortening) |

TABLE 2

| 50/050 PET PULP, Weight 65 gsm | | | | |
|---|---|---|---|---|
| Tests | Orientation | Unit | Result | Methods |
| Tensile Strength | Machine Direction | Neutons/5 cm | 170 | IN. FR QAL. 103-B |
| | Cross Web Direction | Neutons/5 cm | 55 | |
| Elongation | Machine Direction | % | 15 | |
| | Cross Web Direction | % | 80 | |
| Absorption Capacity | N/A | % | 700 | World Strategic Partners (WSP) |
| Temperature Tolerance of Seal (Degradation Temperature) | N/A | Degrees F. | 725 | Applied Heat thru Sealing Bar |
| When Used with 3 mil EMA Bonding Polymer Ideal Bonding Temperature | N/A | Cycles/Min 120 | Dwell Time MS 0.049 | Temperature 750 |
| Heat Resistance of Fibrous Material (Degradation Temperature) | N/A | Degrees F. | 400 | Temperature at which fibrous material shows signs of degradation after 5 minutes (e.g., curling, discoloring, or fibers shortening) |

In some embodiments, the reusable bag 100 includes a printed design 430, as shown in FIG. 1. The printed design 430 may be any of a variety of graphic elements, including by FIG. 8). In some embodiments, the handles 455 are formed after the anterior panel 105 and the posterior panel 110 have been joined along the upper edge 120, the side seams 115, and/or the lower edge 125. In other embodiments, the handles 455 may be formed at a different stage of the manufacturing process. In some embodiments, the reusable bag 100 includes an aperture 470 (not shown in FIG. 8) through the sidewalls 130a, 130b forming each of the handles 455. As better shown in FIG. 1, each aperture 470 may be disposed in the sidewalls 130a, 130b in the area of the handles 455.

With reference to FIG. 8, both the handles 455 and the body 450 are oriented to maximize the weight-bearing capacity and strength of the reusable bag 100. In other words, both the handles 455 and the body 450 are formed such that the longitudinal or weight-bearing axis LA of the reusable bag 100 is parallel to the machine direction of the material 205. This design enables the reusable bag 100 to have greater strength and a higher weight-bearing capacity than a bag formed such that the longitudinal or weight-bearing axis LA of the reusable bag 100 is not parallel to the machine direction of the material 205. Moreover, including the handles 455 above the body 450 of the reusable bag 100 preserves the potential space or carrying volume of the bag 100. As shown in FIG. 1, the user carrying handle is spaced along the longitudinal axis LA, which lies in parallel to the machine direction MD, from the lower edge or lower bonded seam 125. In this form, the weight of the contents in the bag 100 are transmitted from the bonded seam or lower edge 125 along the strong direction of the material to the user handle, while the weaker forces tending to stretch the bag outwardly are countered by the nonwoven material in a direction substantially perpendicular to the machine direction MD.

In alternative embodiments, the reusable bag 100 may be shaped in any of variety of suitable bag shapes and include any of a variety of differently shaped handles. For example, FIGS. 9A and 9B illustrates a reusable bag 500 according to one embodiment consistent with the principles of the present disclosure. The reusable bag 500 is substantially similar to the reusable bag 100 except for the differences described herein. FIG. 9A illustrates the completed reusable bag 500 having handles 515, and FIG. 9B illustrates the reusable bag 500 during a stage of manufacture preceding the formation of the handles 515. The reusable bag 500 includes a body 510 and the handles 515. In the pictured embodiment, the body 510 comprises a generally rectangular sheet of material comprising an anterior panel 520 and a posterior panel 525 (not shown). The anterior panel 520 is attached to the posterior panel 525 at a bottom edge 526 and at side seams 527 via strips of bonding agent as previously described. In the pictured embodiment, the reusable bag 500 is not sealed along an upper edge 528. Rather, the bag 500 is open at the upper edge 528, and the anterior panel 520 can be spaced apart from the posterior panel 525 at the upper edge 528.

In the pictured embodiment, the handles 515 comprise a cut-out part of the material 205 forming the body 510. Although FIG. 9A does not show the posterior panel 525 of the bag 500, it is to be understood that the bag 500 includes a handle 515 on both the anterior panel 520 and the posterior panel 525. In one instance, as shown in FIG. 9B, the handles 515 are created by die-cutting out the shape 530 outlined by the dotted line 535 from both the anterior panel 520 and the posterior panel 525 (not shown in FIG. 9A or 9B). In some embodiments, the die-cut handles 515 are formed after the anterior panel 520 and the posterior panel 525 have been joined to each other along the side seams 527 and/or the bottom edge 526. In some embodiments, the bag 500 may include gussets at the bottom edge 526 and/or the side seams 527. In other embodiments, the handles 515 may be formed at a different stage of the manufacturing process.

In some embodiments, the handle 515 may be longitudinally spaced from the bottom edge or lower bonded seam 526 along the machine direction MD of the material to increase the strength (e.g., the weight-bearing capacity) of the bag 500. In alternative embodiments, the reusable bag 500 may be formed such that the longitudinal or weight-bearing axis LA of the reusable bag 500 is perpendicular to the machine direction of the material 205 (e.g., the longitudinal or weight-bearing axis LA of the reusable bag 500 is parallel to the cross-direction of the material 205).

Figure 10A:
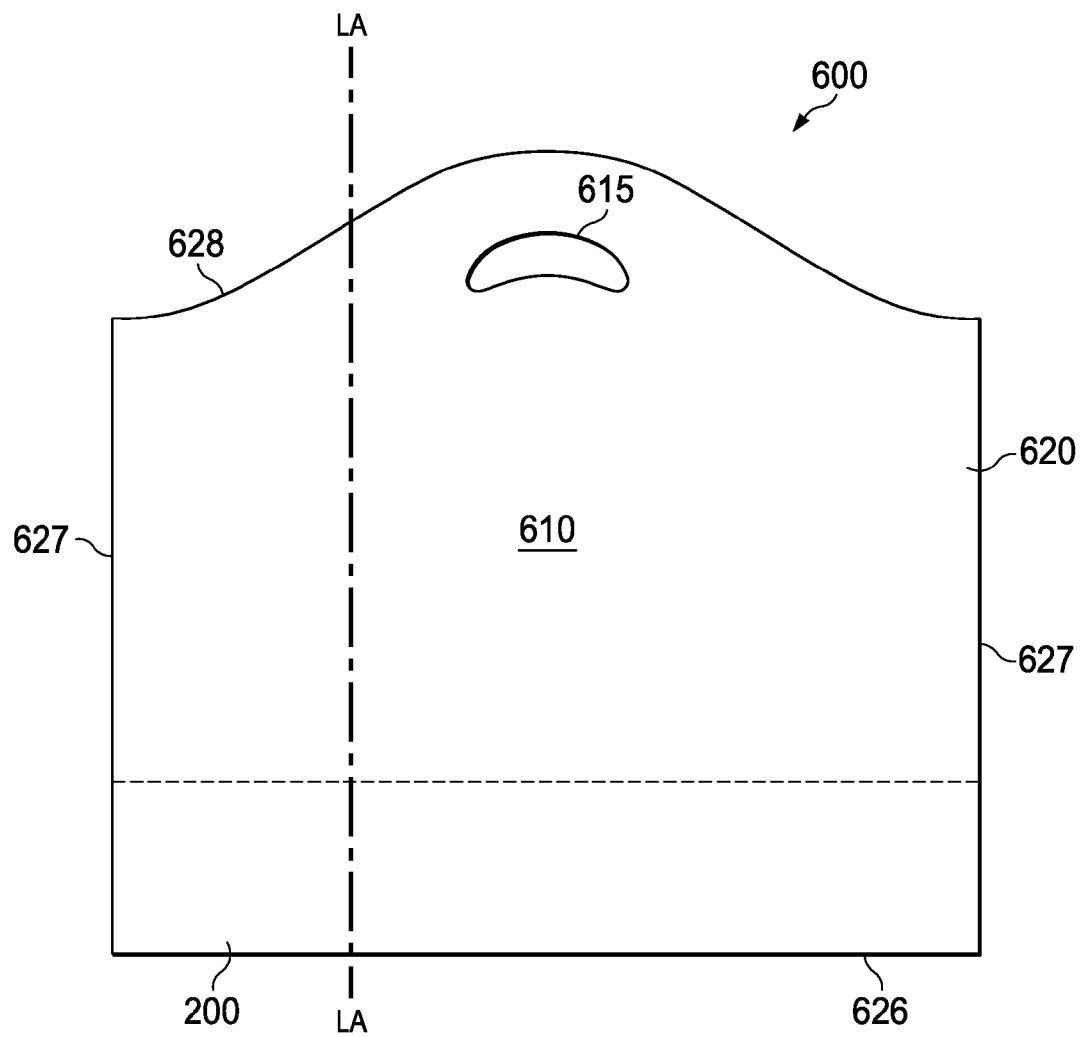
FIG. 10A illustrates a front view of a reusable bag in accordance with one embodiment of the present disclosure.
Figure 10B:
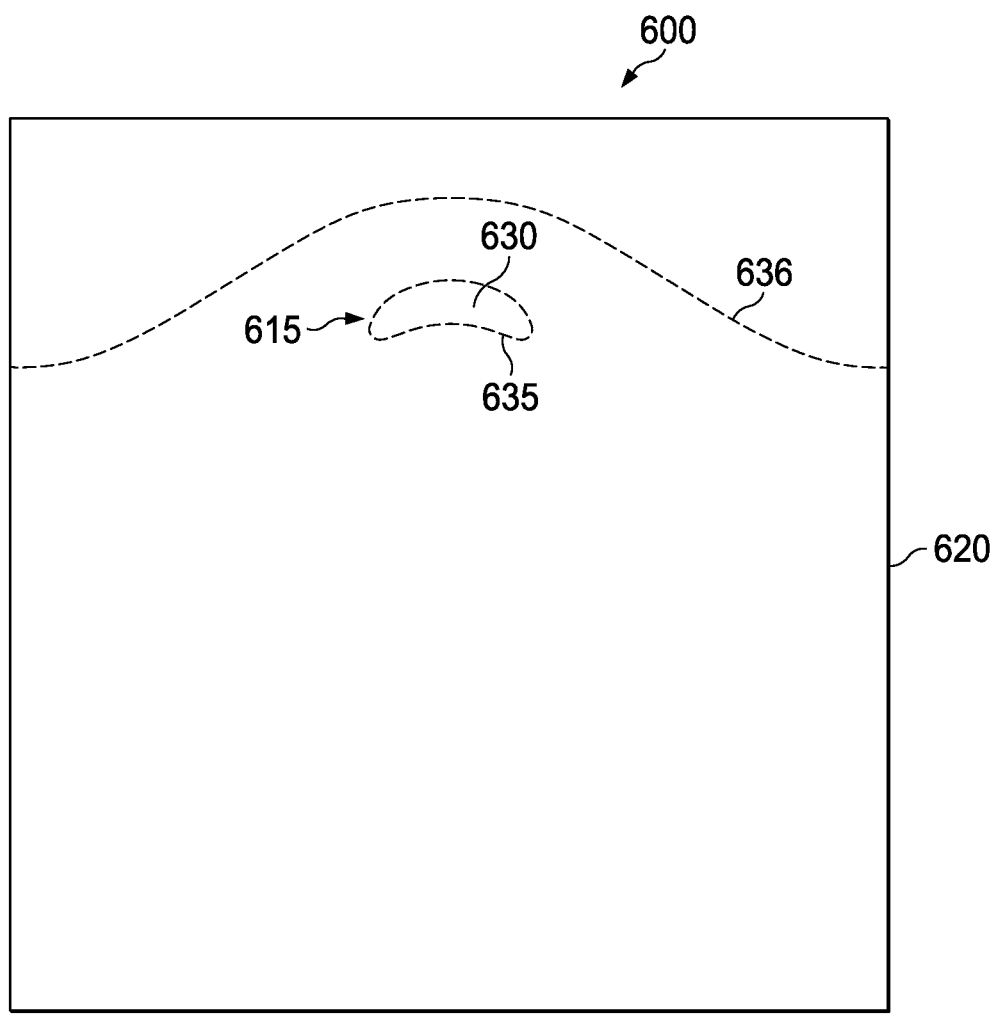
FIG. 10B illustrates a front view of the reusable bag shown in FIG. 10A (in an unfinished state) in accordance with one embodiment of the present disclosure.

FIGS. 10A and 10B illustrates a reusable bag 600 according to one embodiment consistent with the principles of the present disclosure. The reusable bag 600 is substantially similar to the reusable bag 100 except for the differences described herein. FIG. 10A illustrates the completed reusable bag 600 having handles 615, and FIG. 10B illustrates the reusable bag 600 during a stage of manufacture preceding the formation of the handles 605. The reusable bag 600 includes a body 610 and the handles 615. In the pictured embodiment, the body 510 comprises a generally rectangular sheet of material comprising an anterior panel 620 and a posterior panel 625 (not shown). The anterior panel 620 is attached to the posterior panel 625 at a bottom edge 626 and at side seams 627. In some embodiments, the bag 600 may include gussets at the bottom edge 626 and/or the side seams 627. In the pictured embodiment, the reusable bag 600 is not sealed along an upper edge 628. Rather, the bag 600 is open at the upper edge 628, and the anterior panel 620 can be spaced apart from the posterior panel 625 at the upper edge 628. In the pictured embodiment, the upper edge 628 comprises a curved edge.

In the pictured embodiment, the handles 615 comprise a cut-out part of the material 205 forming the body 610. Although FIG. 10A does not show the posterior panel 625 of the bag 600, it is to be understood that the bag 600 includes a cut-out feature or handle 615 on both the anterior panel 620 and the posterior panel 625. In one instance, as shown in FIG. 10B, the handles 615 are created by die-cutting out the shape 630 outlined by the dotted line 635 from both the anterior panel 620 and the posterior panel 625 (not shown in FIG. 10A or 10B). In one instance, the upper edge 628 of the reusable bag 600 may be created by cutting both the anterior panel 620 and the posterior panel 625 of the body 610 along the dotted line 635. In some embodiments, the handles 615 and the upper edge 628 are formed after the anterior panel 620 and the posterior panel 625 have been joined to each other along the side seams 627 and/or the bottom edge 626. In other embodiments, the handles 615 and/or the upper edge 628 may be formed at a different stage of the manufacturing process. It is important to note that the reusable bag 600 may be formed such that the longitudinal or weight-bearing axis LA of the reusable bag 600 is perpendicular to the machine direction of the material 205 (e.g., the longitudinal or weight-bearing axis LA of the reusable bag 600 is parallel to the cross-direction of the material 205).

Any other types of handles may be utilized with the reusable bags described herein. For example, in alternative embodiments, the handles may comprise additional pieces of material (made of either the fibrous material 205 or another material) that are attached to the body of the reusable bag. In some embodiments, the handles may be secured to the body of the bag via the melt-bonding methods using the bonding agent 200 described above. In other embodiments, the handles may be attached to the body of the bag by any of a variety of fixed coupling mechanisms including, by way of non-limiting example, adhesive, including polymer adhesive and double-sided tape, melt-bonding, ultrasonic sealing means, heat sealing means (e.g., using polymers, polythenes, or other plastic coatings or plies), or any other suitable bonding arrangement capable of securely sealing the handles to the body. The handles may be shaped in any of a variety of shapes, including, without limitation, a kidney shape (as shown in FIGS. 9a-10b), an ovoid shape, and a rectangular shape.

The following tables illustrate experimental data reflecting the absorption characteristics of different types of reusable bags having different types of fibrous material 205. Tables 3 and 4 illustrate experimental data obtained from testing of a reusable bag 100 (i.e., a "T-shirt" bag) and a bag 600 (i.e., a "wave top" bag). Table 3 illustrates experimental data obtained from testing each type of bag (i.e., reusable bag 100 and reusable bag 600) wherein each bag was made from fibrous material composed of Viscose non-woven fibers having a weight of 65 gsm. Table 4 illustrates experimental data obtained from testing each type of bag wherein each bag was made from fibrous material composed of polyethelene terephthalate (PET) and paper pulp non-woven fibers having a weight of 65 gsm. Both Tables contain data from experiments involving Processes A and B. In Process A, the bag was submerged in a container containing 12 ounces of tap water for 5 minutes, removed, and then placed in a strainer over the same container for 10 seconds. In Process B, the bag was washed, wrung dry, and placed in a dryer on low heat for 15 minutes before repeating essentially the same experiment performed in Process A.

TABLE 3

Viscose (Tencel by Lenzing) (100%), Weight 65 gsm

| Process | Design of Bag | Bag Size, Width × depth × height (inches) | Weight Unit | Amount of Water in Cup | Remaining Water after Soaking | Amount Absorbed | Material Weight (without adhesive) | Absorption Ratio (Water Absorbed to Material Weight) |
|---|---|---|---|---|---|---|---|---|
| A (Remaining Water After Soaking) | T-shirt (e.g., bag 100) | 12 × 7 × 22 | Ounce Gram | 12 340.2 | 4.2 119.1 | 7.8 221.1 | 1.0 29 | 7.5:1 |
| A (After Soaking 5 minutes and Straining) | Wave Top (e.g. bag 600) | 12 × 7 × 22 | Ounce Gram | 12 340.2 | 4.8 136.1 | 7.2 204.1 | 0.9 24.5 | 8.1:1 |
| B (After Soaking 5 minutes and Straining) | T-shirt (e.g., bag 100) | 12 × 7 × 22 | Ounce Gram | 12 340.2 | 4 113.4 | 8 226.8 | 1.0 29 | 7.3:1 |
| B (After Soaking 5 minutes and Straining) | Wave Top (e.g. bag 600) | 12 × 7 × 22 | Ounce Gram | 12 340.2 | 4.6 130.4 | 7.4 209.8 | 0.9 24.5 | 8.1:1 |

TABLE 4

PET/Paper Pulp (50%:50%), Weight 65 gsm

| Process | Design of Bag | Bag Size (inches) | Weight Unit | Amount of Water in Cup | Remaining Water after Soaking | Amount Absorbed | Material Weight (without adhesive) | Absorption Ratio (Water Absorbed to Material Weight) |
|---|---|---|---|---|---|---|---|---|
| A (Remaining Water After Soaking) | T-shirt (e.g., bag 100) | 12 × 7 × 22 | Ounce Gram | 12 340.2 | 5.3 150.3 | 6.7 189.9 | 1.1 32 | 5.9:1 |
| A (After Soaking 5 minutes and Straining) | Wave Top (e.g. bag 600) | 12 × 7 × 22 | Ounce Gram | 12 340.2 | 6.1 172.9 | 5.9 167.3 | 0.9 26.7 | 6.3:1 |

TABLE 4-continued

PET/Paper Pulp (50%:50%), Weight 65 gsm

| Process | Design of Bag | Bag Size (inches) | Weight Unit | Amount of Water in Cup | Remaining Water after Soaking | Amount Absorbed | Material Weight (without adhesive) | Absorption Ratio (Water Absorbed to Material Weight) |
|---|---|---|---|---|---|---|---|---|
| B (After Soaking 5 minutes and Straining) | T-shirt (e.g., bag 100) | 12 × 7 × 22 | Ounce Gram | 12 340.2 | 5.2 147.4 | 6.8 192.8 | 1.1 32 | 6.0:1 |
| B (After Soaking 5 minutes and Straining) | Wave Top (e.g. bag 600) | 12 × 7 × 22 | Ounce Gram | 12 340.2 | 6.3 178.6 | 5.7 161.6 | 0.9 26.7 | 6.1:1 |

The devices and methods disclosed herein describe various embodiments of a reusable bag. In some embodiments, the exemplary reusable bag disclosed herein is composed of biodegradable and compostable material comprising wood pulp and another material such as, by way of non-limiting example, polyester or another plastic. In one aspect, the bags are formed of material 205 having a high flexibility such that the bag can be folded without permanent deformation. Given that the reusable bags disclosed herein are flexible and compactible without material deformation, the user may fold or flatten the reusable bag and store it (e.g., in a drawer or cabinet) easily. In addition, in another aspect, the bags may have a second use as a rag (e.g., as a so-called "RagBag") having an absorbency of at least 2 to 1 of absorbed water weight to bag weight. In addition, the bag material may have a softness that will not scratch furniture or paint finishes, such as those on cars. In one aspect, the handle-o-meter stiffness test, the cantilever stiffness test, and/or the Gurley stiffness test of the material 205 is reflective of its softness. In a further feature of the bags disclosed herein, the material forming the bag, including the bonding agents (as described above with reference to FIG. 1), can withstand washing in soap and water while still retaining the bag properties.

In some instances, the reusable bag disclosed herein may be re-used several times as a shopping bag until it exhausts its usefulness as a carrying tool. At that time or at any time before bag degradation, several embodiments of reusable bags disclosed herein may be repurposed as reusable rags for household chores. For example, in some instances, the user may employ the reusable bag as a cleaning rag for wiping down household surfaces (e.g., counters, windows, or floors), cleaning a car, and/or mopping up spills. In between uses, the user can rinse, wash, and/or sanitize the reusable bags disclosed herein. The reusable bags disclosed herein are relatively inexpensive to manufacture and they may be reused multiple times in a myriad of ways before exhausting their usefulness. Accordingly, consumers may be more likely to invest in the purchase of these reusable bags than other, more expensive and less useful reusable bags. In addition, the extended lifespan of the reusable bags disclosed herein for purposes other than as carrying tools leads to less trash (e.g., in the form of plastic shopping bags and/or paper towels) entering the environment.

As mentioned above, the reusable bags disclosed herein are configured for multiple re-use and re-purposing. For example, in at least one embodiment, the reusable bags disclosed herein (e.g., reusable bag 100) are configured to have a minimum lifetime capability of 125 or more uses in carrying at least 22 pounds over a distance of at least 175 feet. In testing for this durability and weight-bearing strength, a user may repeatedly conduct a "walk test," in which he or she places at least 22 pounds inside the cavity of the bag, lifts the bag, carries the bag 175 feet, and places the bag down. The user then repeats the "walk test" 124 times to assess whether the bag preserves its carrying functionality through the 125 trials. In some instances, the bag is unloaded and re-loaded every 25 "walk tests." The bag is considered to have failed the test if any of the following are true: (1) a hole greater than 3 cm in length in its longest dimension is observed; and (2) the handle of the bag tears or stretches to an extent that it becomes unusable or no longer supports the bag in a reasonable position. In addition, in some embodiments, the reusable bag 100 is capable of being washed (i.e., cleaned and disinfected) at least 100 times without degrading. In addition, in some embodiments, the fibrous material 205 of the reusable bag 100 is at least 2.25 mils thick. Moreover, in some embodiments, the reusable bag 100 meets the standards of the California Toxics in Packaging Prevention Act (i.e., no more than 100 ppm by total weight combined of Lead, Cadmium, Mercury, and Hexavalent Chromium). Moreover, in some embodiments, the reusable bag 100 meets any standards for minimum recycled content established by regulation adopted by the Department of Environment, City, and County of San Francisco.

In some embodiments, the reusable bags described herein have equivalent weight-carrying capacities in both a dry and a wet condition (at least up to a given weight limit). In one example, a dry reusable bag may be able to carry the same weight (e.g., 22 pounds) as a wet reusable bag. Table 5 illustrates experimental data obtained from wet and dry carrying tests using two different reusable bags 100. One bag was made from fibrous material composed of Viscose (Tencel by Lenzing) non-woven fibers having a weight of 65 gsm, and the other bag was made from fibrous material composed of polyethelene terephthalate (PET) and paper pulp non-woven fibers having a weight of 65 gsm. Each bag was tested in the following manner: a 22 pound weight was placed in the cavity of the bag, the bag was carried 175 feet, the bag was set down, and the bag was carried another 175 feet. This exercise was repeated 125 times or until the bag failed the test. Failure of the test occurred if the bag broke or developed a tear as large as 3 cm in its longest dimension.

TABLE 5

Wet/Dry Carrying Test

| Material | Weight (gsm) | Bag Size (height × depth × width in inches) | Wet/Dry | Carries | Performance |
|---|---|---|---|---|---|
| Viscose | 65 | 12 × 6.5 × 22 | Dry | 125 | Minor elongation; Some wear; No tears |
| Viscose | 65 | 12 × 6.5 × 22 | Wet | 42 | Noticeable elongation near the weighted area; Minor wear; Failed when developed a 3 cm tear in bottom seam |
| 60/40 PET Pulp | 65 | 12 × 6.5 × 22 | Dry | 125 | Minor MD elongation; Noticable CD elongation at bottom; No tears |
| 60/40 PET Pulp | 65 | 12 × 6.5 × 22 | Wet | 125 | Minor MD elongation; Significant CD elongation at bottom; Noticable wear at bottom; Bag stretched and deformed yet still functional |

Persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

I claim:

1. A reusable, multi-purpose bag, comprising:
   a flexible, resiliently deformable body comprising:
      a first porous material having a first degradation temperature and an absorption ratio of at least two to one of absorbed water weight to bag weight, the first porous material forming an anterior panel and a posterior panel, the anterior panel positioned adjacent to the posterior panel to define a cavity therebetween; and
      a discrete strip of heat-sealed bonding agent material having a melting temperature that is lower than the first degradation temperature,
   wherein the discrete strip of heat-sealed bonding agent material is positioned between at least a portion of the anterior panel and at least a portion of the posterior panel, the discrete strip of heat-sealed bonding agent material between the at least a portion of the anterior panel and at least a portion of the posterior panel sealing the anterior panel to the posterior panel, and wherein the first porous material and the heat-sealed bonding agent material can withstand washing in soap and water while retaining the bond between the first material and heat-sealed bonding agent material.

2. The reusable, multipurpose bag of claim 1, wherein the discrete strip of heat-sealed bonding agent material comprises a thickness of at least 0.5 mils.

3. The reusable, multipurpose bag of claim 1, further including a longitudinal axis extending from an upper edge of the first material to a lower edge of the first material, wherein the longitudinal axis is substantially parallel with a machine direction of the first material that comprises a weight-bearing axis of the body.

4. The reusable, multipurpose bag of claim 1, wherein the first material comprises a nonwoven fibrous material.

5. The reusable, multipurpose bag of claim 4, wherein the first material comprises a mixture of polymer fibers and pulp fibers.

6. The reusable, multipurpose bag of claim 5, wherein the ratio of polymer fibers to pulp fibers in the first material is approximately 5:7.

7. The reusable, multipurpose bag of claim 1, wherein the first material has a weight of at least 50 grams per square meter.

8. The reusable, multipurpose bag of claim 1, further including at least one sidewall formed of the first porous material by the coupling of the anterior panel and the posterior panel along a longitudinally-oriented side seam.

9. The reusable, multipurpose bag of claim 8, further comprising a handle defined in the first porous material, the handle formed as an aperture through the at least one sidewall.

10. The reusable, multipurpose bag of claim 8, further including a gusset formed by the inward folding of the at least one sidewall, wherein the discrete strip of heat-sealed bonding agent material is disposed on an exterior surface of the body within the gusset to seal the gusset.

11. The reusable, multipurpose bag of claim 1, further comprising an inked design applied to the first material and coated with an overprint-varnish.

12. The reusable, multipurpose bag of claim 1, further comprising an antimicrobial agent applied to the first material.

13. A reusable, multi-purpose bag, comprising:
a flexible, resiliently deformable body formed of a porous nonwoven fibrous material having an absorption ratio of at least two to one of absorbed water weight to bag weight, the body comprising:
an anterior panel of the porous nonwoven fibrous material including a first upper edge and a first lower edge;
a posterior panel the porous nonwoven fibrous material including a second upper edge and a second lower edge, the anterior panel being coupled to the posterior panel by a bonding agent applied between the anterior panel and the posterior panel and defining a cavity therebetween, the bonding agent being different than the nonwoven fibrous material; and
a longitudinal axis comprising a weight-bearing axis of the body extending from the first upper edge to the first lower edge substantially in parallel with a machine direction of the nonwoven fibrous material;
an opening between the first upper edge and the second upper edge, the opening in communication with the cavity; and
a bag handle defined by an opening in a portion of the porous nonwoven fibrous material adjacent the first and second upper edges of the porous nonwoven fibrous material, the opening being spaced from the first and second lower edges along the longitudinal axis substantially in parallel to the machine direction,
wherein the porous nonwoven fibrous material comprises a nonwoven mixture of polymer fibers and pulp fibers.

14. The reusable, multipurpose bag of claim 13, wherein the bonding agent has a lower melting temperature than the nonwoven fibrous material and the bonding agent melts onto the nonwoven fibrous material and hardens to bond at least a portion of the anterior panel to at least a portion of the posterior panel.

15. The reusable, multipurpose bag of claim 13, wherein the nonwoven fibrous material comprises a mixture of polymer fibers and pulp fibers.

16. The reusable, multipurpose bag of claim 13, wherein the handle incorporates at least one of the first upper edge and the second upper edge and is disposed on a sidewall formed where the anterior panel is longitudinally coupled to the posterior panel.

17. The reusable, multipurpose bag of claim 13, further including a gusseted sidewall formed by the coupling and folding of the anterior panel and the posterior panel along the longitudinal axis.

18. The reusable, multipurpose bag of claim 17, wherein the bonding agent is applied to an exterior surface of the body to seal at least a portion of the anterior panel to at least a portion of the posterior panel and form the gusseted sidewall.

19. A reusable, multi-purpose bag, comprising:
a flexible, resiliently deformable body formed of a nonwoven fibrous material having a degradation temperature and an absorption ratio of at least two to one of absorbed water weight to bag weight, the body comprising:
an anterior panel including a first upper edge and a first lower edge;
a posterior panel including a second upper edge and a second lower edge, the anterior panel coupled to the posterior panel to define a cavity therebetween; and
a discrete strip of heat-sealed bonding agent disposed between the anterior panel and the posterior panel to seal the anterior panel to the posterior panel, wherein the bonding agent has a lower melting temperature than the degradation temperature of the nonwoven fibrous material and the discrete strip melts onto the nonwoven fibrous material and bonds the anterior panel to the posterior panel;
an opening between the first upper edge and the second upper edge, the opening in communication with the cavity;
a handle defined by an opening in the nonwoven fibrous material adjacent the first and second upper edges; and
a longitudinal axis extending from the first upper edge to the first lower edge.

20. The reusable, multipurpose bag of claim 19, further comprising a gusset formed on the body, wherein the discrete strip of heat-sealed bonding agent is disposed on an exterior surface of the body to seal at least a portion of the anterior panel to at least a portion of the posterior panel and form the gusset, and wherein the discrete strip of heat-sealed bonding agent comprises a thickness of at least 0.5 mils.

21. The reusable, multipurpose bag of claim 19, wherein the longitudinal axis of the body is substantially in parallel with a machine direction of the nonwoven fibrous material comprising a weight-bearing axis of the body.

22. The reusable, multipurpose bag of claim 19, wherein the bag has a material strength sufficient to carry a weight of at least twenty-two pounds for a distance of at least 21,875 feet without developing a tear of 3 centimeters or greater in the nonwoven fibrous material.

23. A reusable, multi-purpose bag, comprising:
a flexible, resiliently deformable body formed of a nonwoven fibrous material, the body comprising:
an anterior panel of the nonwoven fibrous material including a first upper edge and a first lower edge;
a posterior panel of the nonwoven fibrous material including a second upper edge and a second lower edge, the anterior panel coupled to the posterior panel to define a cavity therebetween;
a bonding agent, the bonding agent applied between the anterior panel and the posterior panel to seal the anterior panel to the posterior panel, the bonding agent having a lower degradation temperature than the nonwoven fibrous material; and
a longitudinal axis extending from the first upper edge to the first lower edge substantially in parallel with a machine direction of the nonwoven fibrous material;
an opening between the first upper edge and the second upper edge, the opening in communication with the cavity; and
a handle defined by an opening in a portion of the nonwoven fibrous material extending in parallel with the machine direction from the first and second lower edges to above the opening of the handle, the opening being spaced from the first and second lower edges along the longitudinal axis in parallel with the machine direction, wherein the handle incorporates at least one of the first upper edge and the second upper edge and is disposed on a sidewall formed adjacent where the anterior panel is longitudinally coupled to the posterior panel.

24. The reusable, multipurpose bag of claim 23, wherein the nonwoven fibrous material has an absorption ratio of at least two to one of absorbed water weight to bag weight.

25. The reusable, multipurpose bag of claim 23, wherein the bonding agent is disposed between the anterior panel and the posterior panel in a longitudinal strip that is generally parallel to the longitudinal axis of the bag to form a side seam.

26. The reusable, multipurpose bag of claim 25, wherein the bonding agent is disposed between the first upper edge and the second upper edge in a longitudinal strip that is generally perpendicular to the longitudinal axis of the bag.

27. The reusable, multipurpose bag of claim 26, further comprising a gusset on the body, wherein the bonding agent is disposed on an exterior surface of the body to seal at least a portion of the anterior panel to at least a portion of the posterior panel and form the gusset.

28. The reusable, multipurpose bag of claim 1, wherein the discrete strip of second material comprises a pre-cut width.

29. The reusable, multipurpose bag of claim 13, wherein the bonding agent comprises a discrete strip comprising a pre-cut width.

\* \* \* \* \*

UNITED STATES PATENT AND TRADEMARK OFFICE
CERTIFICATE OF CORRECTION

| | | |
|---|---|---|
| PATENT NO. | : 9,132,939 B2 | Page 1 of 1 |
| APPLICATION NO. | : 13/974790 | |
| DATED | : September 15, 2015 | |
| INVENTOR(S) | : Eric Grossman | |

It is certified that error appears in the above-identified patent and that said Letters Patent is hereby corrected as shown below:

In The Claims

Column 21, line 14, Claim 13, between "posterior panel" and "the porous nonwoven fibrous material" insert -- of --.

Signed and Sealed this
First Day of March, 2016

Michelle K. Lee
*Director of the United States Patent and Trademark Office*